March 17, 1964   A. E. FEINBERG ETAL   3,125,705
GAS DISCHARGE LAMP CIRCUITS EMPLOYING
SATURABLE TYPE TRANSFORMER
Filed March 3, 1959   4 Sheets-Sheet 1

INVENTORS
ALBERT E. FEINBERG
PAUL BERGER
BY Morris Spector
ATTY.

INVENTORS
ALBERT E. FEINBERG
BY PAUL BERGER
ATTY.

March 17, 1964

A. E. FEINBERG ETAL 3,125,705

GAS DISCHARGE LAMP CIRCUITS EMPLOYING
SATURABLE TYPE TRANSFORMER

Filed March 3, 1959

INVENTORS
ALBERT E. FEINBERG
BY PAUL BERGER

Morris Spector
ATTY.

United States Patent Office 3,125,705
Patented Mar. 17, 1964

3,125,705
GAS DISCHARGE LAMP CIRCUITS EMPLOYING
SATURABLE TYPE TRANSFORMER
Albert E. Feinberg and Paul Berger, both of
2950 N. Western Ave., Chicago, Ill.
Filed Mar. 3, 1959, Ser. No. 796,802
63 Claims. (Cl. 315—278)

This invention relates to electric ballasts for starting and operating discharge devices particularly negative resistance devices, and relates also to the starting and operating circuits for such devices. More specifically it is concerned with the means for producing, from a sinusoidal source of voltage, a wave of a preferred shape for starting and operating such devices.

It is known in the art to operate one or more discharge devices, such as fluorescent lamps, from a high leakage reactance transformer wherein the primary and the secondary are loosely coupled and wherein the magnetic core structure has a bridged air gap. It is an object of this invention to provide such an arrangement that the saturation effects produced by the bridged gap result in an output voltage wave shape that is highly desirable for the starting and/or operating discharge lamps of the type above set forth.

The ideal alternating voltage wave shape for fluorescent lamp operation is a square or a rectangle since with this wave the lamps operate continuously at a uniform voltage. This results in good operating efficiency and long lamp life. However, this wave shape is not supplied by the public utilities nor is it obtainable by equipment which is simple and inexpensive in terms of fluorescent lighting equipment.

It is another object of this invention to provide a circuit and/or a ballast for one or more discharge devices such as fluorescent lamps, and wherein the output voltage of the ballast rises from zero more rapidly than a sine wave and yet has a relatively low crest or peak value of voltage. This results in good light output and long tube life.

Certain constant wattage high pressure mercury type ballasts produce higher voltages by magnification of the third harmonic that is present in the output voltage of such ballasts. We have found that magnification of the third harmonic does not give the desired results when the ballast is designed for use with low pressure gaseous discharge devices.

It is another object of the present invention to produce in a ballast an arrangement wherein an odd harmonic higher than the third is used to superimpose peaks on the fundamental to create higher voltages.

With increased frequency of the harmonic that is being accentuated there is an increase in the electromagnetic losses in the iron core. Also at higher frequencies the steel losses tend to reduce the amplitude of the ferroresonance. Consequently, we have found that the seventh harmonic is frequently the most desirable one to be accentuated in accordance with the principles of the present invention. Higher amplitudes may be obtained with the fifth harmonic. We have found, however, that at the fifth harmonic, with certain lamps and certain circuits, objectionable peaks may be introduced in the current wave shape upon discharge through the lamps.

It is a still further object of this invention to provide a ballast having a saturating portion of such size with relation to the rest of the iron core structure as to facilitate the production of a high amplitude odd harmonic, by a circuit that includes a condenser and an inductance that are approximately resonant at that harmonic.

A ballast of the present invention is particularly applicable for starting and operating a mercury lamp that requires a high output ballast. Such lamps carry a rating of 800 milliamperes or greater. These lamps are commonly connected in a circuit known as the rapid-start series-sequence circuit. In such circuit two lamps are operated in series with one another and with a small capacitor shunting one of the lamps to effect sequence starting of the lamps from a source of voltage lower than the sum of the required starting voltages of the two lamps. The lamps have heating filaments which are supplied with heating current to preheat the cathodes prior to starting. In the normal lead-type ballast for operating these lamps it is usual for the voltage across the secondary to rise appreciably after the lamps are ignited. It is therefore the usual practice to place all of the cathode filament heating current supply windings upon the primary so that the filament voltage during operation shall not exceed the voltage supplied during starting. By constructing the ballast to accentuate the harmonics as above set forth, the voltage of the secondary remains essentially constant from starting to operation, or may actually drop slightly during operation below the starting voltage across the secondary. As a result of this novel feature it is possible to place one or more of the filament heating windings directly on the secondary of the transformer.

A high leakage reactance transformer can be produced without the use of magnetic shunts between the primary and the secondary if the secondary is made comparatively long in relation to its thickness. When this is done in a saturable core transformer that has a bridged air gap in the region of the secondary, it sometimes happens that the resulting leakage reactance is excessive and that a diminution of the reactance by reducing the length and increasing the thickness of the secondary is not the most economical of arrangements. It is possible to control the leakage reactance by making a secondary winding in the form of two coils and placing those two coils on opposite sides of the primary. When this is done the magnetic core is provided with separate bridged gaps, one for each secondary section.

It is a still further object of this invention to provide a high leakage reactance transformer wherein a part of the secondary is included in the very coil that includes the filament heating windings and the primary, so that the filament heating windings are closely coupled not only to the primary but also to part of the secondary.

The present invention is not limited to ballasts that are intended to operate fluorescent lights that are connected in a rapid-start series-sequence circuit. It is also applicable to other circuits, including a circuit for operating a single lamp from a ballast.

It is an object of this invention to provide a ballast which operates from a commercial source of alternating current and in which means is provided for producing and accentuating a harmonic above the third, superimposed upon the fundamental, to give a wave shape which is advantageous for starting and operating a negative resistance glow discharge device such as, for instance, a fluorescent lamp.

The principles of the present invention are applicable to ballasts wherein the secondary is isolated from the primary and to ballasts wherein the secondary is connected in step-up auto-transformer relationship to the primary. Likewise the tuned circuit that produces or accentuates the controlling harmonic may include a part or all of the secondary winding that supplies the lamp starting and operating current or it may be connected to the secondary or the primary, or insulated from both.

In a lamp ballasting circuit wherein two or more condensers are provided for performing different functions, we have found that it is frequently possible to provide a common terminal for a number of condensers. When this is the case it is possible to construct all of the condensers that are to be connected to the common terminal as a single structure with one electrode or conductive foil in common. It is therefore an additional object of this invention to provide a condenser wherein two or more conducting electrodes or condenser foils which are insulated from one another constitute the plates of separate condenser units and wherein a common plate or foil is located in capacity relationship to all of those separate foils. This substantially reduces the lead-in problems in connection with the condensers.

The attainment of the above and further objects of the present invention will be apparent from the following specification taken in conjunction with the following drawings forming a part thereof.

In the drawings.

Reference may now be had more particularly to the drawings wherein like reference numerals designate like parts throughout.

Figure 1:
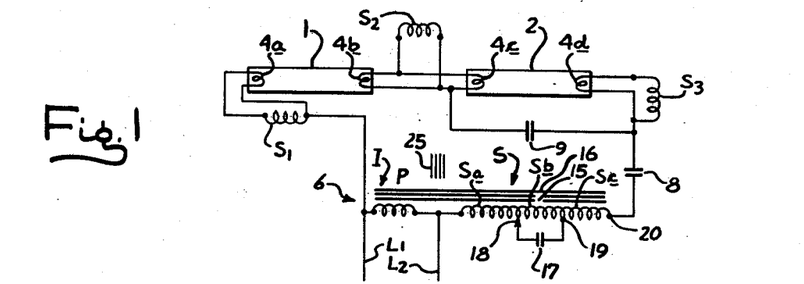
FIG. 1 is a diagrammatic circuit illustrating one embodiment of the principles of this invention.
Figure 2:
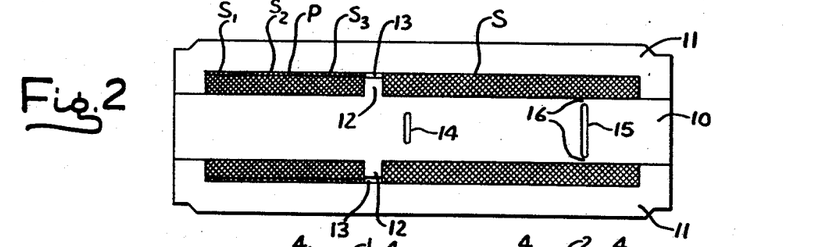
FIG. 2 is a diagrammatic representation of a core structure for the circuit of FIG. 1.

FIGS. 1 and 2 are schematic layouts for the purpose of facilitating an explanation of the principles of the present invention. In this layout 1 and 2 designate fluorescent lamps of the type that are provided with cathode heating filaments 4—4 and adapted for operation in a rapid-start series-sequence type of circuit. Each lamp may be a 96 inch T-12 high output lamp or a 72 inch T-12 high output lamp. These lamps take about 800 milliamperes current. In a rapid-start series-sequence circuit two identical lamps are connected in series for series operation from a source of voltage lower than the combined starting voltages of the two lamps and one of the lamps is shunted by a small condenser to provide starting current for the other lamp. Thereafter the shunted lamp starts. A high leakage reactance ballast 6 for operating these lamps includes a primary P, a secondary S in step-up auto-transformer relationship to the primary, a series condenser 8, a lamp shunting condenser 9 and an iron core structure I coupling the primary and the secondary to provide the necessary starting and operating voltages. The iron core has an air gap 15 bridged magnetically at 16 by a magnetic bridge of appropriate cross section, as will be more fully set forth. The primary P is adapted to be connected by leads $L_1$ and $L_2$ to a commercial source of substantially sinusoidal alternating voltage of a fixed frequency, which in all of the embodiments hereafter described will be assumed to be sixty cycles per second. The primary P has three additional sets of coils or turns indicated at $S_a$, $S_b$ and $S_c$ for supplying filament heating currents for the cathode heating filaments $4a$, $4b$, $4c$ and $4d$. The primary and the heating filament turns $S_a$, $S_b$ and $S_c$ may consist of a single continuous spool of wire with the heating turns $S_1$, $S_2$ and $S_3$ surrounding the primary and therefore closely coupled to it and loosely coupled to the secondary. They are here shown spaced from the primary merely for illustrative purposes.

The secondary, S may consist of a continuous coil, successive turns of which extend from left to right in one layer and back from right to left in the next superposed layer with suitable taps to divide it into coils $S_a$, $S_b$, and $S_c$, or it may consist of three separate aligned spools containing the portions of the secondary turns indicated at $S_a$, $S_b$ and $S_c$, respectively, of which more will be said presently.

FIG. 2 shows, in diagrammatic form, a core structure for the ballast 6. This structure includes a stack of core laminations 10 on which the primary and secondary coils are located and two identical stacks of shell laminations 11—11. The core lamination has integral shunts 12 separating the primary and secondary windings and extending towards the shell laminations and spaced therefrom by short air gaps 13—13 of a length generally less than one tenth of an inch to form a loose coupling between the primary and secondary as is customary in high leakage reactance transformers for fluorescent light ballasts. Each core lamination 10 has a comparatively short slot 14 therein, whose essential function is to improve power factor, and a comparatively long slot 15 therein, to control the secondary leakage flux and provide air gaps bridged at 16—16 for controlling the flux density through the laminations to the flux wave shape to produce the desired harmonics.

In starting of the lamps, the shunting condenser 9 permits starting current for the lamp 1 to flow over a circuit including the condenser 8 and the secondary S. Thereafter the lamp 2 starts, all as known in the art.

The important novel feature of the circuit of FIG. 1 lies in the provision of the condenser 17 in relation to the rest of the ballast. By placing this condenser across a portion of the secondary S, as indicated by the points 18—19, a leading current is drawn in the loop circuit that includes $S_a$ and the condenser 17. This leading current has a phase angle with respect to the primary magnetizing current of such a nature that the flux created by this leading current is essentially additive to the flux produced by the primary magnetizing current. By making the air gap 15 of such width that the bridges 16 at both sides of the air gap are of a combined width sufficiently small, as hereinafter set forth, the secondary open circuit voltage wave shape and the load current wave shape may be very accurately controlled by the capacity of the condenser 17 and the location of the points 18—19. For instance, by moving the points 18—19 from the position shown to the points 19—20 the wave shape is changed. The same results from changes in the size of the condenser 17. It is thus possible to adjust the condenser 17 and the location of the points 18—19 to produce a desired predominant harmonic in the output voltage of the ballast and to develop in the lamp current a crest factor of the order of 1.44. The crest factor is the ratio of peak to r.m.s. voltage. This is extremely good as compared to transformers ordinarily used for the operation of gaseous discharge tubes wherein a crest factor of 1.6 has been considered satisfactory. The crest factor of the lamp discharge current is extremely important in that the lamp watts are affected by the crest factor, and considerable lamp currents are necessary to obtain the rated wattage with poor crest factor. For example, the commercial type of 800 milliampere ballasts require 850 to 900 milliamperes to obtain the full rated light output with their existing crest factors. Measurements of a test ballast embodying the principles set forth above wherein the loop $S_b$—17 is tuned to produce a predominant seventh harmonic in the wave of the output voltage of the ballast indicate that it is possible to obtain full rated light output at 800 milliamperes with a ballast of the present invention.

The principles of the theory of action which are believed to be involved are that the cross sectional area of the saturating portions 16—16 of the ballast should be such that as the magnetic flux therein rises from zero during each half of the magnetic flux cycle through the iron, the iron should reach saturation in the time that is required for the voltage wave of the particular harmonic chosen, in this instance the seventh, to reach its peak. Thus, in the case of the seventh harmonic the half wave of the harmonic reaches its peak or 90° point in approximately one-fourteenth of a half cycle of the fundamental, or in approximately 13° of the magnetic flux cycle. Therefore it would appear that when the number of the harmonic to be accentuated is represented by the letter "$n$" and the electrical circuit is tuned accordingly, a maximum amplitude of this harmonic will be obtained if the flux density in the saturating portion 16—16 of the iron structure, reaches saturation in $$\frac{1}{2n}$$

fractional part of the magnetic flux cycle through the iron, which is in $$\frac{1}{2n}$$

fractional part of the duration of a half wave of the fundamental.

During each half cycle of operation of the ballast, after the lamps have started, the A.C. voltage (and current) on the output side of the ballast goes through its zero point. At that time the harmonic voltage is being added to the fundamental on the output side of the lamps. After current commences to rise from the zero value the condition changes. Thereafter during the remainder of the half cycle of the A.C. wave the seventh harmonic is a decaying transient and soon reaches a low or zero value. It is believed that this mode of operation is repeated during each half cycle of the fundamental. However, quite independently of the question of the accuracy of applicant's theory of operation the fact remains that when a ballast is constructed in the manner herein set forth, there is a resulting increase in the light output of the lamps and a corresponding permissive reduction in the amount of iron required for the ballast.

It is believe that the above is applicable in explanation of the principles of the sizes of the cross sectional areas of the saturating portions of the iron structures in the various embodiments of the invention hereinafter set forth.

The capacity of the condenser 17 and the spacing of the points 18 and 19 with respect to one another and their position on the secondary is determined experimentally by connecting the output side of the ballast to an oscilloscope and adjusting the value of the condenser 17 and the location of the points 18—19 in such a manner as to give a maximum amplitude to the desired harmonic, in this case the seventh harmonic, in the voltage wave that is produced, and the best output current wave shape. The output voltage consists of the fundamental with a superimposed seventh harmonic of the maximum amplitude obtainable. Thereafter that value of capacity 17 and the relative locations of the points 18 and 19 are used in the commercial structure to be made in which structure the points 18 and 19 are not adjustable nor is the condenser 17 adjustable. The portion of the secondary turns S between the points 18 and 19 may constitute a spool structure mechanically separate from the rest of the secondary or it may consist of a number of turns on the same spool that carries the rest of the secondary as will be more fully set forth as this description proceeds, or it may consist of all of the turns of the secondary.

A typical ballast for operation of two 96 inch 800 milliampere high output lamps 1 and 2 rated at 100 watts each energized from a source of 60 cycle 118 volt alternating current power utilized an iron structure of the shape and dimensions hereinafter set forth in the description of FIG. 2, and wherein the primary P was constructed with 280 turns of No. 18 wire and the secondary S had 1238 turns of No. 21 wire. The capacitor 17 was placed across 1110 turns of the secondary. The capacitor values were set at 4.20 microfarads for the condenser 8; 0.075 microfarads for the condenser 9 and 0.3 microfarads for the condenser 17. All condensers were rated at 550 volts A.C. By measurements the required voltages of the condensers 9 and 17 were well below 550 volts during starting and during operation, and the required voltage for the condenser 8 was 520 volts with lamp current flowing. The values and wire sizes given above are designed for an extremely cool running unit. Utilizing the normal wire sizes which have been heretofore required in the prior art it would be possible to produce a ballast with the same operating temperature as existing ballasts and which would be approximately 1½ inches shorter or 17 percent shorter than existing ballasts intended for like lamp operation. The secondary turns required utilizing this invention is approximately 20 to 30 percent less than required in standard ballasts for operating two such lamps in a rapid-start series-sequence circuit. We believe that by the utiliaztion of the capacitor 17 together with the air gap in the secondary portion of the core we are able to obtain a condition of ferro-resonance, or approximating ferro-resonance, at the seventh harmonic of the applied voltage. The significance of the utilization of a high-frequency harmonic such as this is important. Insofar as concerns the higher frequencies the requisite inductance within the circuit becomes negligible inasmuch as at frequencies of 360 cycles and higher a capacitor will operate as well as an inductance to discharge sinusoidally through a gaseous discharge tube. At 60 cycles, a capacitor utilized as a discharge device by itself creates a peaked discharge in which all of the discharge occurs during a very small portion of each half cycle. Therefore pulses of light are obtained instead of the light obtainable from a sinusoidal wave. At 360 cycles or higher the rate of condenser discharge through the lamp is such that the discharge approaches a sinusoidal shape. Because of this, utilizing a seventh harmonic superimposed upon the fundamental minimizes the rate of discharge of the capacitor that is utilized in conjunction with the seventh harmonic, and therefore the peaked pulse due to this capacitor which would have a discharge frequency of approximately 420 cycles does not produce an objectionable peak on the current wave shape.

It appears to be most desirable to use odd frequency harmonics since these frequencies are reinforced each half cycle, thus creating higher voltages. While it may be possible that the same results are obtainable with frequencies higher than the seventh, for instance, the ninth and eleventh harmonics, there is a problem in that at those higher frequencies the losses within the steel of the ballast are such as to reduce the amplitude of the ferro-resonance. Acceptable results may be obtained with the fifth harmonic. However, with certain lamps objectionable peaks may be produced by the fifth harmonic. It appears that the seventh harmonic is the most desirable in the system of FIG. 1.

In the apparatus and system of the present invention while the seventh harmonic may produce some small auxiliary peaks the presence of the condenser 17 tuned to the seventh harmonic across all or a portion of the secondary winding improves the ratio of peak to r.m.s.

current flowing through the negative resistance discharge device.

The current flowing through the loop circuit that includes the condenser 17 and the portion of the secondary between the points 18 and 19 is of a wave shape that is the sum of the fundamental and the harmonic to which the circuit is tuned. Insofar as concerns the fundamental component of this current the result is an increase in the flux density at the secondary portion of the transformer. This increase may cause the flux density at the secondary portion of the transformer to equal or exceed the flux density at the primary portion of the transformer.

Insofar as concerns the harmonic component of the current flowing in this circuit we have found that by tuning this circuit to the particular harmonic involved, namely the seventh in this instance, the output voltage is considerably increased over that which would be obtained with the same capacitor across the circuit but untuned in ferro-resonance to a harmonic.

Figures 3, 4:
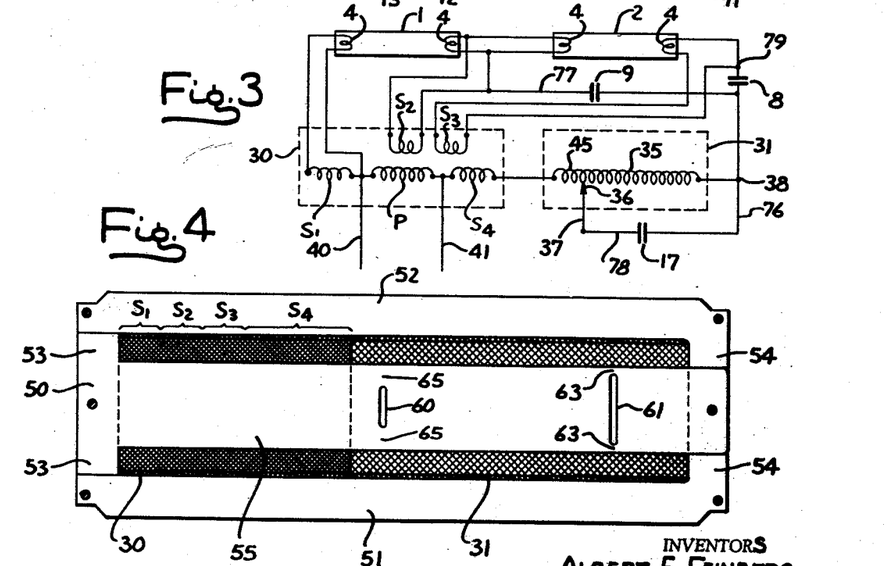
FIG. 3 shows a circuit diagram of another embodiment of the present invention.
FIG. 4 illustrates the mechanical arrangement of the core and coil of the system illustrated in FIG. 3.

Reference may now be had more particularly to FIGS. 3 and 4 illustrating the circuit and the iron structure respectively of a ballast embodying the principles above set forth. In this embodiment the lamps 1 and 2 are of a type previously described being connected in a rapid-start series-sequence type of circuit as previously described. The ballast proper has two spools of windings indicated at 30 and 31 respectively. The spool 30 includes the primary P, the filament heating coils $S_1$, $S_2$ and $S_3$ and a third coil $S_4$. The spool 31 comprises a single winding 35 which is tapped at a point 36 by a tap wire 37 that is connected across the rest of the winding 35 between the point 36 and the point 38. The entire coil of the spool 31 is connected in series with the secondary turns $S_4$ on the spool 30.

The primary is adapted to be connected to a source 60 cycle 120 volt alternating current by means of leads 40 and 41.

In the embodiment illustrated in FIG. 3 the spool 30 was of an axial length of 3 inches and was formed of No. 18 wire. The primary P consisted of 280 turns formed in five layers of 56 turns per layer. A sixth layer was formed consisting of 20 turns in the coil section $S_4$ and 9 turns each in the coils $S_1$, $S_2$ and $S_3$. The spool 31 was 4.45 inches in length and consisted of 1152 turns of No. 21 wire arranged in 9 rows of 128 turns per row. The point 36 was spaced 85 turns from the end 45 of the coil 31. The condenser 17 was of a capacity of 0.265 microfarad at 551 volts, the condenser 8 was 4.25 microfarads, and the condenser 9 was 0.075 microfarad.

The iron structure of the ballast of FIG. 3 is that illustrated in FIG. 4. It includes a stack of T-shaped core laminations 50 on which the spools 30 and 31 are slipped, and two similar stacks of L-shaped laminations 51—52 that complete the magnetic circuit.

The width of each of the L-shaped laminations of the structure of FIG. 4 is .570 inch which is the same as the width of the portions 53—53 of the core and the portions 54—54 of the L-shaped laminations. The shank 55 is 1.140 inches. The overall length of the iron core structure is 8.630 inches. Each lamination is .025 inch thick, there being 55 laminations in each stack making an overall stack thickness of 1⅜ inches. The laminations were of cold reduced silicon steel of the type used in electrical ballasts. The spool 30 is placed on the shank 55 up against the head thereof and the spool 31 is placed immediately against it. The shank of each core lamination has two air gaps comprising slots 60 and 61 therein for controlling the secondary leakage flux. Each of these slots is of a length of 0.050 inch in the direction axially of the shank 55. The slot 61 extends almost completely across the shank 51 leaving bridging portions 63—63 each of a width of 0.100 inch in a direction transversely of the shank 55 as seen in FIG. 4. The air gap 60, which is closer to the spool 30 leaves two similar bridges 65—65 in the shank 55, these bridges being each of a width of 0.320 inch in a direction transversely of the shank 55 as seen in FIG. 4. It is the size of the bridges 63—63 that is critical. In this instance the bridges 63—63 are of a combined width of 17.6 percent of the width of the shank 55, so that the combined cross sectional area of the bridges are 17.6 percent of that of the shank 55.

The spool 30, as previously stated, has six rows of turns of wire and it is the outermost row or layer that is divided into four parts, three of which that are indicated by reference numerals $S_1$, $S_2$ and $S_3$ constituting the windings for supplying the filament heating current, and the fourth of which indicated by the reference numeral $S_4$ being connected in series with the windings on the spool 31 to constitute a part of the secondary.

As may be seen from FIG. 4 the turns $S_4$ are very closely coupled with the remaining turns of the primary in the five layers that are surrounded by the turns $S_4$. The rest of the secondary, which are the turns on the spool 31, are loosely coupled with the primary, those turns that are located in the right hand half of the spool 31 as seen in FIG. 4 being very loosely coupled with the primary.

The structures of FIGS. 2 and 4 are high leakage reactance transformers, the high leakage reactance of FIG. 2 being obtained by the iron shunts 12, and the high leakage reactance of FIG. 4 being obtained by making the secondary coil 31 of comparatively great length in relation to its thickness and proportioning the iron structure as shown, including the air gaps 60 and 61, which increase the magnetic leakage.

It would appear that the bridges 16—16 of FIG. 2 or 63—63 of FIG. 4 should be of such width that as the flux density in the iron rises from zero, during each half cycle of the fundamental, they become saturated in a time which is the reciprocal of the harmonic being accentuated. If the seventh harmonic is being accentuated, the bridges are made of such size as to become saturated in approximately the first one-seventh of each half cycle of the fundamental. For primary flux densities in the main iron of the core of the order of 12.5 to 15 kilo gausses, at rated voltage, as usually used in fluorescent ballasts, it would appear that the desired condition of saturation of the restricted or bridge section 16—16 is met when the bridge section is of the order of or less than 20 percent of the cross section of the core 10 of FIG. 2 or 55 of FIG. 4.

If desired the turns $S_4$ may be entirely omitted from the primary spool 30 and an appropriate number of additional turns provided on the secondary 35.

Figures 5, 6, 7, 8, 10:
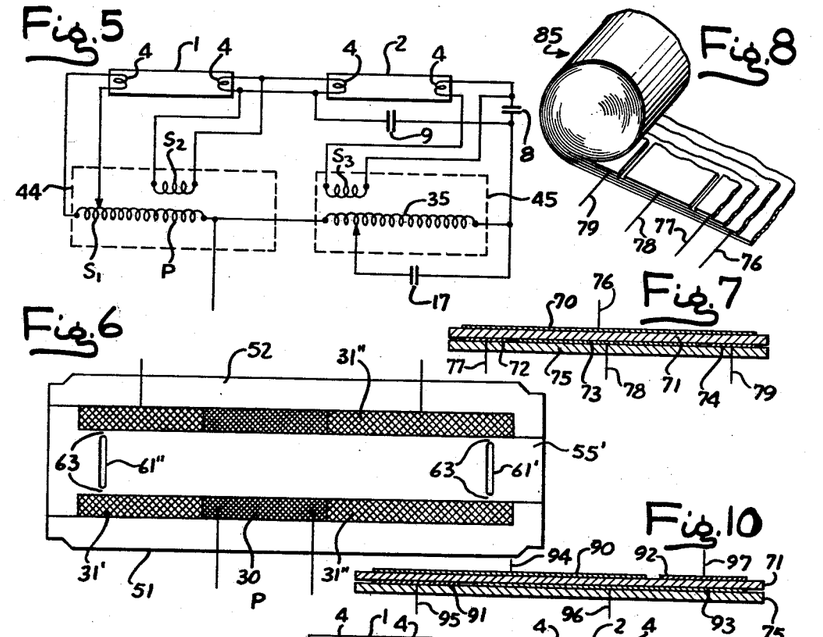
FIG. 5 shows a modification of the circuit of FIG. 3.
FIG. 6 shows still another modification of the circuit of FIG. 3 wherein the secondary is divided into two separate coil sections one on each side of the primary.
FIG. 7 shows one way of forming the condensers of the circuit of FIG. 3.
FIG. 8 is a diagrammatic perspective view of the formed condenser.
FIG. 10 shows a way of forming the condensers for the circuit of FIG. 1.

As previously stated in those high reactance type ballasts of the prior art which are connected in rapid-start series-sequence types of circuits, it is usual for the voltage across the secondary to rise after ignition of the lamps. This fact compels the placing of the filament heating windings $S_1$, $S_2$ and $S_3$ all upon the primary because the filament voltage during operation must not exceed the filament voltage during starting. Since it is characteristic of the ballasts of FIGS. 1 and 3 that the voltage of the secondary remains substantially constant from starting to operation, or may actually drop in operation, with respect to the starting voltage, it is now possible to place one or more of the filament heating windings on the secondary 31 instead of on the primary. This is illustrated in FIG. 5 wherein one of the filament heating windings, $S_3$, is placed on the secondary, surrounding the secondary coil 35. $S_3$, as before, may consist of approximately nine turns of wire. In other respects the circuit and ballast of FIG. 5 is identical with that of FIGS. 3 and 4. It includes two spools 44 and 45 that correspond respectively to the spools 30 and 31 of FIG. 3, differing therefrom only in the location of the filament heating winding $S_3$. The iron structure on which the spools are mounted is that illustrated in FIG. 4.

In FIG. 5 we have shown only one filament heating winding located on the secondary, the other two being on the primary. It is within the purview of the present invention also to mount one or both of the remaining two filament heating windings directly on the secondary spool 45 instead of on the primary spool 44.

In order to provide an economic ratio of iron to copper in the ballast structure it may be desirable to make the secondary appreciably longer than shown. When this is the case in a ballast having only two spools of windings as in FIGS. 1 or 3, the excess length of the secondary may produce an undesirable large leakage reactance, or the coupling between the secondary and the primary may be looser than is desired. For those or other reasons the turns comprising the secondary spool of FIG. 3 may be divided into two parts, preferably but not necessarily equal parts, to constitute two separate spools. The two spools are electrically connected in series and mechanically located on the iron structure of FIG. 4 on opposite sides of the primary. This is illustrated in FIG. 6 wherein the spool 30 is located between two separate spools 31' and 31", the two spools 31' and 31" being electrically connected in series with one another to constitute the windings 35 and 45 of FIG. 3 and electrically connected in the identical circuit illustrated in FIG. 3. The shank 55' of the iron structure is now provided with two air gaps 61' and 61" each of the size and shape proportioned to accentuate the seventh harmonic as previously set forth for the corresponding air gap 61 of FIG. 4. In other respects the constants of the iron structure and of the respective windings and condensers are the same as previously described for FIGS. 3 and 4.

In the circuit illustrated in FIG. 3 each of the condensers 8, 9 and 17 is connected to a common terminal 38. This has been done primarily to enable the simplification of condenser structures and the simplification of connecting wiring. The three condensers 8, 9 and 17 may therefore be constructed as a single unit having a total of four terminals. This is illustrated in FIG. 7. In this condenser a conducting foil 70 is overlaid by a sheet of insulation 71 such as a thin paper sheet which in turn is overlaid by three separate ribbons of conducting foil 72, 73 and 74 and in turn overlaid by a single sheet of paper 75. The sheets of paper 71 and 75 are the conventional thin sheets of paper used as dielectrics in condensers. In this instance they must be able to withstand 550 volts A.C. Foil 70 has a lead out wire 76 connected thereto while the foils 72, 73 and 74 each have lead out wires 77, 78 and 79 respectively. The foils 70, 72, 73 and 74 with their separated dielectrics 71 and 75 are wound into a roll as is conventional in condenser structure. The capacity effect between the foil 70 and the foil 72 constitutes the condenser 9. The capacity effect between the foil 70 and the foil 73 constitutes the condenser 8 and the capacity effect between the foil 70 and the foil 74 constitutes the condenser 17. The foils 72, 73 and 74 are of such relative lengths and widths to give the relative capacity effects previously indicated. Thus the single roll condenser 85 of FIG. 8 with four terminals 76, 77, 78 and 79 may be connected in the circuit of FIG. 3.

Figure 9:
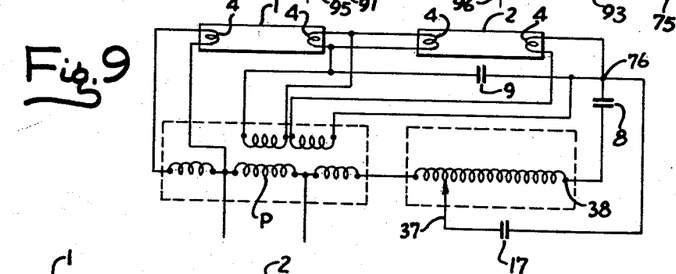
FIG. 9 shows an alternate arrangement of a portion of the circuit of FIGS. 1 or 3.

If desired the condenser connections of FIG. 3 may be somewhat changed as indicated in FIG. 9 so that the condenser 17 in series with the condenser 8 shunts the portion of the secondary and is tuned to be resonant at the seventh harmonic as previously stated, whereas the condenser 9 merely shunts the lamp 2. The rest of the connections of the circuit of FIG. 9 and the iron structure are identical with the connections and iron structure of FIGS. 3 and 4 respectively.

Figure 11:
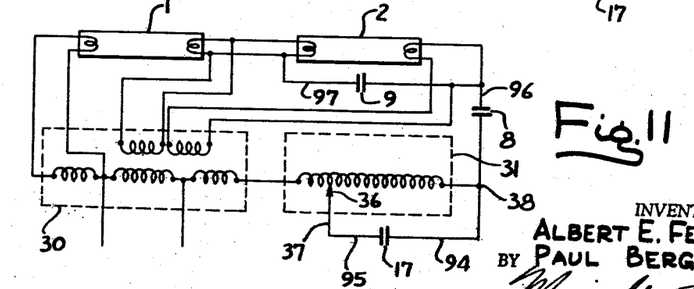
FIG. 11 shows another modification of a portion of the circuit of FIG. 3.

In FIG. 3 the shunt circuit across the lamp 2 includes the large series condenser 8 and the small condenser 9. If desired the series condenser 8 may be excluded from the shunt circuit so that the condenser 8 is in series with a loop circuit that includes the condenser 9 and the lamp 2 in parallel with one another. This is the conventional arrangement and is illustrated, in fragmentary form, in FIG. 11, as applied to the novel circuit of FIG. 3. Parts of the circuit of FIG. 3 are not illustrated in FIG. 11 merely for the sake of simplification, it being understood that the rest of the circuit of FIG. 11 is that illustrated in FIG. 3 and that the iron structure is that of FIGURE 4. In this instance the small capacity condenser 9 directly shunts the lamp 2 and provides a by-pass path around the lamp 2 for the starting current to the lamp 1. The three condensers 8, 9 and 17 of FIG. 11 may be made as a single mechanical structure. This structure is as illustrated diagrammatically in FIG. 10. Here there are provided four separate lengths of conductive foil indicated at 90, 91, 92 and 93 separated by the same sheets of paper 71 and 75 as described for FIG. 7. The foil strips 90, 91, 92 and 93 are separate from one another. The respective foil strips have separate lead-in wires or terminals 94, 95, 96 and 97. In this instance terminal 94 is connected to the terminal 38 of the secondary winding (FIG. 11). The terminal 95 is connected to the point 36 of the secondary winding. The terminal 96 is connected to one side of the lamp 2 and the terminal 97 is connected to the other side of the lamp 2, between that lamp and the lamp 1. It is thus apparent that the condenser 9 is represented by the capacity effect between the foils 92 and 93; the capacity effect of the condenser 8 is represented by the capacity between the foils 90 and 93, whereas the capacity of the condenser 17 is represented by the capacity effect between the foils 91 and 94. The areas of the respective foils are less as to produce the desired capacity effects. The superposed paper sheets 71–75 with the foils arranged thereon as shown, is rolled into a roll, which may be circular or oval, substantially as illustrated in FIG. 8.

Figure 12:
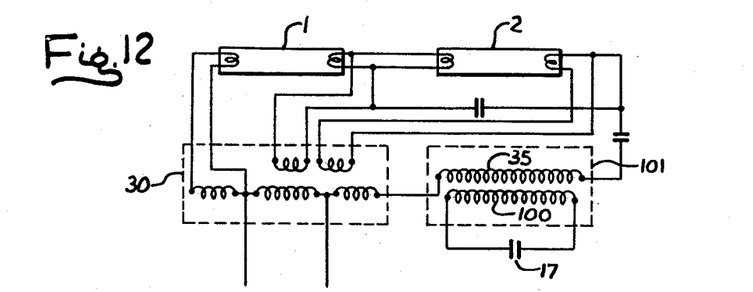
FIGS. 12, 13 and 14 show still other modifications of the circuit of FIG. 3.

In the embodiments of the invention above described where the condenser 17 shunts a portion of the secondary coil, the turns of the secondary extend progressively from left to right in one layer and from right to left in the next surrounding layer, etc. The turns shunted by the condenser 17 are all distributed in a direction lengthwise of the entire secondary. Other methods may be used to obtain the same results. For instance, an auxiliary coil may be provided, in series with the condenser 17, which auxiliary coil is electrically insulated from the secondary. The turns of this auxiliary coil may be concentric about the secondary coil to constitute one spool therewith or may be on a separate spool. FIG. 12 illustrates one circuit for accomplishing this result. The circuit of FIG. 12 is identical with that of FIG. 11 except that there is provided an auxiliary secondary 100 that is located on the secondary spool 101 of the ballast which corresponds to the spool 31 of FIG. 3. The winding 100 is shunted by the condenser 17. The wire of the coils of the auxiliary coil 100 may be wound on the same spool as the secondary S, surrounding that secondary and extending the full length of the spool, or, the secondary 100 may comprise a separate spool placed between the spool 31 of FIG. 3 and the spool 30, or, alternately, it may be placed on the opposite side of the spool 31, the circuit being otherwise that illustrated in FIGS. 1 or 11. When an auxiliary spool is provided for the winding 100 that auxiliary spool is located on the iron structure adjacent to the spool that carries the secondary 35 and in a position such that the bridged air gap that is correlated in size to accentuate the desired harmonic as above set forth is in the magnetic flux path through that auxiliary spool.

In the circuit of FIG. 12 the condenser 17 and the secondary 100 are tuned so that in cooperation with the bridges 63—63 across the air gap 61 (FIG. 4) there is produced, in the secondary part of the iron structure, a flux that tends to produce and accentuate in the secondary the seventh harmonic of the fundamental.

Figure 13:
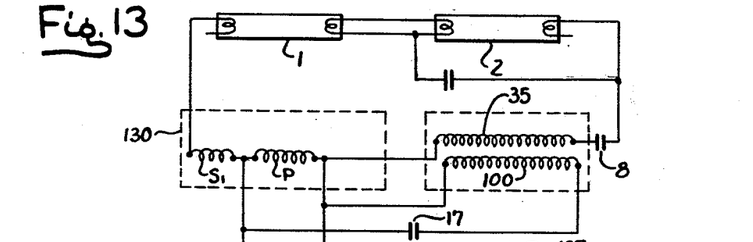

While FIG. 12 shows the secondary 100 as insulated from the primary as well as from the secondary, it is within the purview of the present invention to connect the secondary 100 in step-up auto-transformer relationship with the primary, with the condenser 17 connected thereacross. This is illustrated in FIG. 13 as applied to the circuit of FIG. 3 or FIG. 12. In these embodiments the secondary winding 100 is located on the iron core structure adjacent to or surrounding the secondary winding 35, as in FIG. 12. It may be wound on the same spool with the winding 35, that is surrounding the winding 35, or it may constitute a separate spool placed adjacent to the winding 35 on the iron structure of FIG. 4, preferably, to the right of the winding 35. The winding 100 in series with the condenser 17 is tuned, with respect to the bridges 63—63, to accentuate the seventh harmonic in the secondary.

Figure 14:
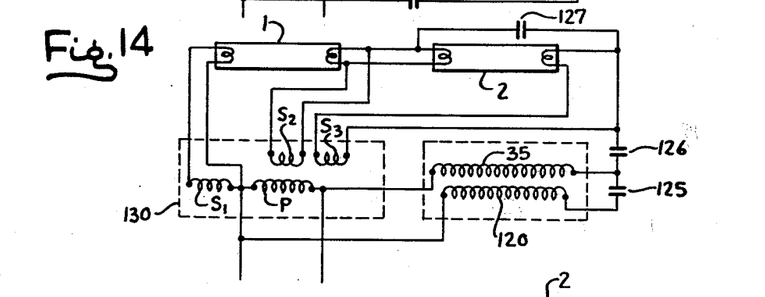

In FIG. 14 there is shown still another arrangement for producing the desired harmonic in a ballast which is otherwise the same as that of FIG. 3. In this instance an auxiliary winding 120 is located on the secondary side of the iron structure. This winding may be wound around winding 35, or it may be a separate coil placed to the right of the winding 35. The winding 120 is connected in series with a condenser 125 across the primary P and the secondary 135. The condenser 125 is tuned with the secondary 120 to resonate its loop circuit at the seventh harmonic, and the bridges 63—63 proportioned to produce a maximum seventh harmonic. The iron structure may be the same as that illustrated in FIG. 4. In this embodiment the coil 130 was one spool corresponding to the spool 30 of FIG. 3. It consisted of No. 19 wire of which 275 turns were included in the primary P, 150 turns in the secondary portion $S_4$ and 10 turns in each of the three filament heating secondaries $S_1$, $S_2$ and $S_3$. The secondary 35 consisted of 1000 turns of No. 21 wire. The secondary 120 was wound on top of the secondary 35 and consisted of 450 turns of No. 32 wire. The condenser 125 was of 0.330 microfarad at 700 volts. The condenser 126 was of 4.6 microfarads at 465 volts and the condenser 127 was 0.07 microfarad at 700 volts. The operating current through the condenser 126 was .250 milliampere. In this circuit by lowering the capacity of the condenser 125 to 0.215 microfarad the wave shape got better and the peaks were shorter but open circuit voltage applicable to the two lamps in series dropped from 540 volts to 465 volts, and the current through the condenser 126 dropped to about 200 milliampers.

If desired the winding 120 with its series condenser 125 may be connected directly across the secondary 35 alone, excluding the primary. In that event the capacity of the condenser 125 would be different, to tune with the winding 120 at the seventh harmonic.

Figure 15:
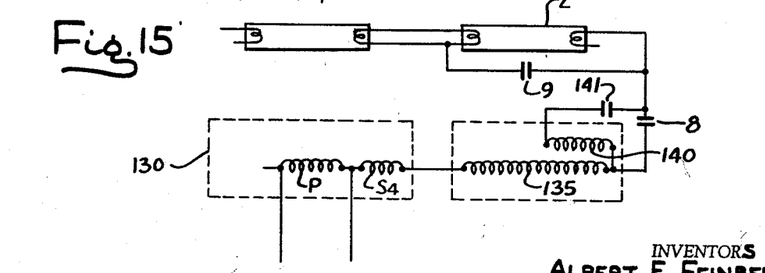
FIGS. 15, 16 and 17 show modifications of the circuit of FIG. 3.
Figure 16:
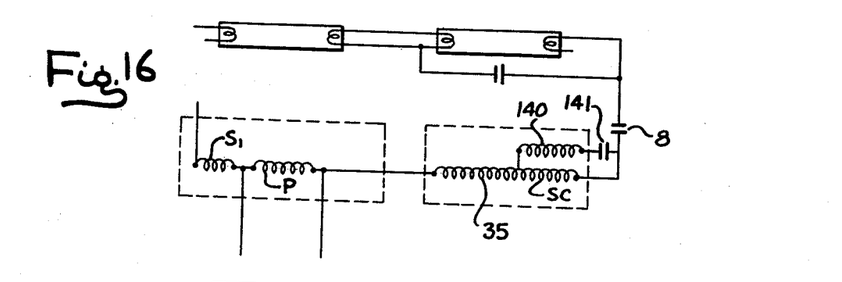
Figure 17:
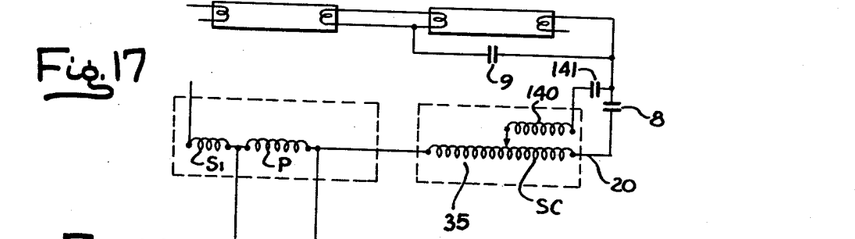

Another method of producing the desired result is by providing the secondary with an additional coil connected in series with a condenser which series circuits may be connected either across the condenser 8 of FIGS. 1 or 3 or across the portion $S_c$ of the secondary of FIG. 1 or across $S_c$ and the condenser 8 in series with one another. These three alternatives are illustrated in FIGS. 15, 16 and 17 respectively. In these figures the auxiliary coil 140 is connected in series with a condenser 141. The coil 140 may be wound concentrically on the outside of the coil 35 or may constitute a separate coil located immediately to the right of the coil 35 on an iron structure such as shown in FIG. 4 with the bridged air gap 61 located in the magnetic flux path through it. In other respects these circuits may be the same as the circuits of FIGS. 1 or 4.

It is to be noted that the arrangements hereinabove described will work satisfactorily for single lamp ballasts in which case the second to start lamp 2 is entirely omitted as is its shunting condenser 9. In such arrangement only two filament heating windings $S_1$ and $S_2$ are necessary. By means of these omissions from the circuits hereinabove described, particularly the figures of 1 and 3, there is produced a single lamp ballast.

While the above description has been made in conjunction with two lamp ballasts of the type that have filament heating windings that are to be pre-heated, it is also applicable to lamps that do not have to be pre-heated as for instance the instant start lamps, in which case the filament heating windings $S_1$, $S_2$ and $S_3$ would be omitted.

It is furthermore to be noted while in each of the above descriptions the secondary S or the secondary 35 is connected in autotransformer relationship to the primary. It is within the purview of the present invention to provide an arrangement wherein that secondary is electrically insulated from the primary. This is particularly useful in those circuits that have a fractional part of the secondary turns closely coupled to the primary, for instance, surrounding the primary as illustrated in FIG. 3.

In each of the ballasts previously described there is used a non-linear reactor together with a condenser and a saturating magnetic portion so proportioned and arranged as to accentuate the seventh harmonic of the basic frequency over the other harmonics of said frequency in order to produce a resulting wave shape wherein the seventh harmonic is superimposed upon the fundamental. It is within the purview of the present inventiton to tune the respective circuits to the fifth harmonic or the ninth harmonic instead of the seventh, and correspondingly proportion the saturating part of the iron structure that bridges the air gap as heretofore pointed out.

The ballasts of the present invention supply a voltage to the lamps that rises from zero more rapidly than a sine wave and yet that has a relatively low crest or peak value of voltage. This reduces the "off" time of the lamp during each half cycle of the fundamental. Oscillograph studies of the wave shape on the output side of transformer appear to indicate that in a sixty cycle system the peak of the accentuated harmonic is so located with respect to the rising value of the fundamental that re-ignition occurs, during each half cycle, at approximately the point of the peak of that harmonic. Thereafter during the major portion of each half cycle very little current actually flows through the tuning condenser which is the condenser 17 in FIGS. 1 and 3.

In each of the systems above described the inital power source is a sixty-cycle source of substantially sinusoidal alternating current of 118–120 volts.

It is to be noted that in each of the ballasts above described the harmonic that is produced and appears at the output side of the transformer is produced even before the ignition of the first lamp, so that that harmonic is utilized to accelerate the initial starting of the first to start lamp as well as to reduce the off period during each cycle of the fundamental voltage during operation of the lamp.

It is believed that the harmonic oscillations produced by the ballast reach their maximum value during a fractional part of the first quarter of each cycle of the fundamental and continue as damped oscillations of said harmonic frequency to a minimum value towards the end of each half cycle of the fundamental, and repeat this process during each successive half cycle of the fundamental. After the lamps ignite, the damping of the harmonic is accelerated during the remainder of the half cycle of the fundamental.

Figure 18:
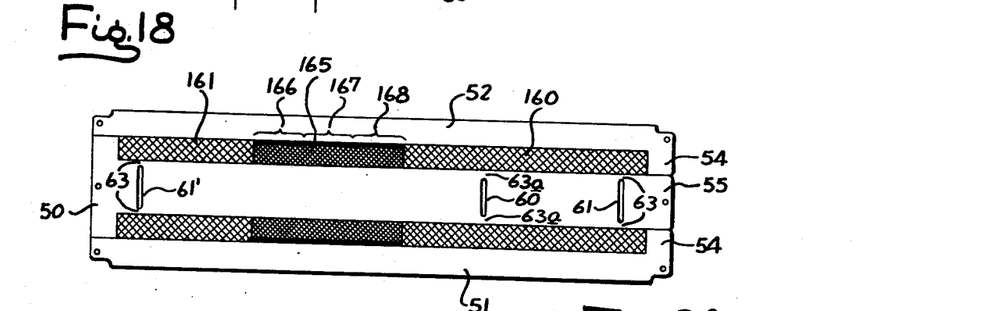
FIG. 18 shows a modified coil arrangement and iron structure.

In the ballast of FIG. 6 there is shown one air gap in the magnetic leakage flux path of each of the spools 31' and 31". In the case of a very long ballast it may be desirable to provide two air gaps in the magnetic leakage flux path of one or both of the winding 31'—31". This is illustrated in FIG. 18. In this case the constants of the iron structure and of the coil structure are somewhat different from the constants heretofore given in connection with FIG. 6. In this instance the over all length of the L-shaped laminations 51–52 is 11.6". The width of these laminations is 0.515". Each T-shaped lamination includes a shank 55 of a width of 1.070" and stem 50 which is 2.020" in length. The laminations are stacked to a height of 1.25". Each of the air gaps 61 and 61' is of a width (in a direction across the stem 55) of .870", leaving bridged gaps 63 of an extent 0.100" in the direction crosswise of the shank 55. The air gaps 60, 61, and 61' are each of the same length (in a direction lengthwise of the stem 55), in this instance 0.050". The gap 60 is of a width of .740", leaving bridges 63a—63a each of a length (across the stem 55) of .165". The center of the gap 60 is 2.750" from the center of the gap 61.

The ballast has two secondary coil spools indicated at 160 and 161 formed of #19 wire. The spool 160 contains 918 turns arranged in nine layers of 102 turns per layer. The eighth layer is tapped at the 816th turn and another tap is provided in the 9th layer at turn 868. The coil 161 consists of 522 turns arranged in nine layers with 52 layers per turn.

Between the spools 160 and 161 there is located a primary 165. This consists of 350 turns of #17 wire arranged in seven layers of 50 turns per layer. Surrounding the outer layer are three additional heating coils 166, 167 and 168 corresponding to the coils $S_1$, $S_2$ and $S_3$ of FIG. 4 and consisting of 13, 13 and 12 turns respectively plus, where desired, an additional 24 turns of wire indicated at 168 to be connected in series with the secondary. The secondary consists of the spools 160 and 161 connected in series with one another, plus the additional primary turns 168 where desired. This secondary is connected in auto transformer relationship with the primary. The coil 160 is approximately 4.5" in length, the coil 165 is 31" in length and the coil 161 is 2.70" in length.

The ballast of FIG. 18 is connected in a circuit like that of FIG. 3. A condenser is connected to one or the other of the two taps on the coil 161 to shunt either 816 turns or 868 turns of the portion of the secondary represented by the coil 160. The condenser is rated as of .265 microfarad capacity which was found to be the capacity necessary to bring to resonance at the ninth harmonic of the fundamental the loop circuit that includes this condenser and the portion of the coil 160 shunted thereby into resonance at the ninth harmonic of the fundamental. The particular number of turns selected to be shunted by the condenser is determined by the precise capacity of the condenser involved, in the light of commercial tolerances in such stock condensers.

The lamps used in the circuit were two 200 watt 96" power groove or VHO or SHO lamps, the primary being connected across a 60 cycle 118 volt A.C. line.

Figure 19:
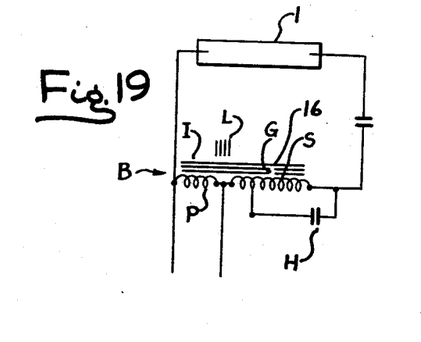
FIG. 19 shows the principles of the present invention as applied to a single lamp ballast.

While the present invention has here been shown as applied to a circuit for furnishing current to a plurality of lamps, it is not limited thereto as it is equally applicable to a single lamp circuit as is illustrated, for instance in FIG. 19.

In this embodiment 1 designates a low pressure electric discharge device which may be, for instance, a fluorescent lamp such as was heretofore described, wherein an electric discharge is formed between spaced electrodes in a hermetically sealed envelope wherein the pressure of the ionizable medium is less than 100 milliameters of mercury, such as, for instance, a fluorescent lamp, although it is to be understood that the lamp 1 may be any other electric discharge lamp whether high pressure or low pressure. The lamp is arranged to be started and operated by a ballast B which is a high leakage reactance ballast having a primary P which is adapted to be connected to a commercial source of alternating voltage of a fixed frequency, say 60 cycles per second, and a secondary S in step-up auto-transformer relationship. The transformer includes an iron structure I. At L there is shown a conventional representation of a leakage path to designate the transformer as a high leakage reactance transformer. This leakage path L may comprise a conventional magnetic shunt between the primary and the secondary or the same effect may be obtained by proper length of the secondary in relation to the primary and the iron core shape to produce a high leakage reactance in a manner known in the art. The secondary S has a harmonic generating condenser H shunting all or a part thereof so that a current flows in the loop circuit that comprises the harmonic generating condenser H and the shunted part of the secondary S. The loop circuit that includes the condenser H and the part of the secondary S that is shunted thereby is made to be resonant at the harmonic whose frequency it is desired to accentuate above all others, which, in accordance with the principles of the present invention is an odd harmonic above the third.

A part of the iron structure through which the secondary flux treads includes a bridged air gap G, the bridging across the gap being of such limited cross-sectional area as to saturate during each half cycle when the flux density in the rest of the transformer has risen to only a fractional part of the maximum density attained during each half cycle. The bridged gap is located at the portion of the flux path through the secondary that includes the secondary turns which are shunted by the harmonic generating condenser H.

If the lamp 1 has cathode heating filaments whose windings may be provided with energy from an electrical source independent of the ballast B or from two separate auxiliary secondaries that may be included in the ballast B, say wound concentrically about the primary, one of said auxiliary secondaries supplying heating current for one cathode heating filament, and the other for supplying heating current to the other cathode heating filament as hereinabove set forth.

Figure 20:
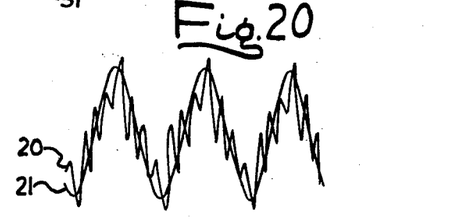
FIG. 20 is an oscillogram of the open circuit output voltage of one typical ballast of the present invention.

FIG. 20 shows at 20 a representative graph of the voltage wave across the primary and secondary when one of the ballasts above described is under no load. The curve 21 which is the sine wave of the line voltage has been superimposed upon the curve 20 to indicate their relative relationship. From these curves it is clear that the resultant open circuit voltage wave 20 contains the seventh harmonic as the predominant harmonic present, which seventh harmonic is of appreciable magnitude. The particular harmonic which is of maximum amplitude is determined by the tuning of the condenser 17 in the loop circuit that includes this condenser and the portion of the secondary. Its magnitude is increased by correlating the size of the saturating iron portions of the transformer, for instance 16—16 of the transformer of FIG. 2 or 63—63 of FIG. 4 to the particular harmonic to be accentuated.

The harmonic generating principles as applied to a transformer in the manner herein above set forth may be used wherever it is desired to have an output voltage wave that includes a fundamental with an accentuated particular odd harmonic. It is particularly applicable in circuits having the characteristics that are present in fluorescent lamps, namely, a system that requires a comparatively high starting voltage and a lower operating voltage and one that requires ballasting. The harmonic generating principles herein above set forth are particularly applicable when applied to the iron structure of a transformer. In the transformer of the present invention the magnetic flux path through the secondary is arranged to saturate in such a fractional part of each half cycle of the fundamental frequency as to accentuate the desired odd harmonic. This is done by utilizing the reactance of a part of the transformer itself whether that reactance is all or a part of the power supplying secondary of the transformer, or an auxiliary coil as hereinabove set forth.

In each of the above described embodiments the circuit that is tuned to or resonates at the desired harmonic frequency is a circuit wherein the power factor at the 60 cycle frequency, which is the frequency of the fundamental, is therefore substantially zero. This resonant or tuned loop circuit is in series in a leading current circuit. The fact that there is a leading series circuit with the lamps provides stability, speed of starting and better power factor for the overall unit.

In each of the circuits of FIGS. 3, 5 and 9 and 11 through 17 the two spools of wire that include the primary and the secondary respectively, are shown spaced apart. This is merely to indicate a loose coupling between the primary and the secondary. The loose coupling may be obtained by spacing them apart, or by providing a magnetic shunt between them as illustrated in FIG. 2 or by making the secondary comparatively long, as illustrated, in which event the spool carrying the primary turns and the spool carrying the second turns are in physical abutment.

In compliance with the requirements of the patent statutes there have been here shown a number of preferred embodiments of the present invention. It is therefore to be understood that the invention is not limited to the precise embodiment herein shown, the same being merely illustrative of the principles of the invention. What is believed to be new and shown to be covered by Letters Patent is:

1. A device for converting substantially sinusoidal A.C. of a given frequency and voltage to A.C. of the same frequency but with a substantial superposed odd harmonic above the third, said device comprising a reactor and means for accentuating in said reactor said harmonic over all the other harmonics of said frequency, said means for accentuating said harmonic comprising a condenser and inductive means in circuit with one another, the inductive means being at least a part of said reactor, said reactor including an iron core having a high reluctance gap with a saturating magnetic bridge thereacross with the bridge located in the magnetic circuit of the inductive means, and said condenser and inductive means being substantially tuned to said harmonic.

2. A device for converting substantially sinusoidal A.C. of a given frequency and voltage to A.C. of the same frequency but with a substantial superposed odd harmonic above the third, said device comprising a reactor and means for accentuating in said reactor said harmonic over all the other harmonics of said frequency, said means for accentuating said harmonic comprising a condenser and inductive means in circuit with one another, the inductive means being at least a part of said reactor, said reactor including an iron core having a high reluctance gap with a saturating magnetic bridge thereacross with the bridge located in the magnetic circuit of the inductive means and of a cross section to saturate in a fraction of each half cycle of the given frequency which is substantially $$\frac{1}{2n}$$

where $n$ is the number of said harmonic, and said condenser and inductive means being substantially tuned to said harmonic.

3. A device for converting substantially sinusoidal alternating voltage of a given frequency to alternating voltage of the same frequency but with a substantial superposed odd harmonic above the third and below the tenth, said device comprising a reactor having an iron core having a portion which is of a cross section to saturate in a fraction of each half cycle of the given frequency which is substantially $$\frac{1}{2n}$$

where $n$ is the number of said harmonic, and means for accentuating in said reactor said harmonic over all the other harmonics of said frequency.

4. A device for converting substantially sinusoidal alternating voltage of a given frequency to alternating voltage of the same frequency but with a substantial superposed odd harmonic above the third, said device comprisprising a reactor and means for accentuating in said reactor said harmonic over all the other harmonics of said frequency, said means for accentuating said harmonic comprising a condenser and inductive means in circuit with one another, the inductive means being at least a part of said reactor, said reactor including an iron core having a high reluctance gap with a saturating magnetic bridge thereacross with the bridge located in the magnetic circuit of the inductive means, and said condenser and inductive means being substantially tuned to said harmonic.

5. A device for converting substantially sinusoidal alternating voltage of a given frequency to alternating voltage of the same frequency but with a substantial superposed seventh harmonic, said device comprising a reactor and means for accentuating in said reactor said harmonic over all the other harmonics of said frequency, said reactor including a magnetic portion restricted to a cross sectional area which will saturate in one fourteenth of each half cycle of the given frequency.

6. A device for converting substantially sinusoidal alternating voltage of a given frequency to alternating voltage of the same frequency but with a substantial superposed seventh harmonic, said device comprising a non-linear reactor and means for accentuating in said reactor said harmonic over all the other harmonics of said frequency, said means for accentuating said harmonic comprising a condenser and inductive means in circuit with one another, the inductive means being at least a part of said reactor, said reactor including an iron core having a high reluctance gap with a saturating magnetic bridge thereacross with the bridget located in the magnetic circuit of the inductive means, and said condenser and inductive means being substantially tuned to said harmonic.

7. A device for converting substantially sinusoidal alternating voltage of a given frequency to alternating voltage of the same frequency but with a substantial superposed fifth harmonic, said device comprising a reactor having an iron core than includes a magnetic portion restricted to a cross sectional area which will saturate within one tenth of each half cycle of the given frequency, and means for accentuating in said reactor said fifth harmonic over all the other harmonics of said frequency.

8. A device for converting substantially sinusoidal A.C. of a given frequency to A.C. having the same fundamental but with a predominant superposed odd harmonic, said device including a primary having input terminals adapted to be connected to a source of A.C. of a given frequency, said device including also a secondary and a magnetic structure having non-linear characteristics coupling the primary and the secondary, and means forming a loop circuit energized from said magnetic structure and tuned to the frequency of said predominant harmonic, said magnetic structure having a portion that reaches saturation during that first fraction part of each half cycle of the source frequency that is less than 90° of the harmonic.

9. A device for converting substantially sinusoidal A.C. of a given frequency to A.C. having the same fundamental frequency but with a predominant superposed odd harmonic, said device including a primary having input terminals adapted to be connected to a source of A.C. of a given frequency, said device including also a secondary and a magnetic structure having non-linear characteristics coupling the primary and the secondary, and means forming a loop circuit of substantially zero leading power factor with reference to the given frequency and energized from said structure and tuned to the said harmonic, said magnetic structure having a portion that saturates in a fraction of a half cycle of the given frequency that is substantially $$\frac{1}{2n}$$

where $n$ is the number of said harmonic.

10. A device for converting substantially sinusoidal A.C. of a given frequency to A.C. having the same fundamental but with a predominant superposed odd harmonic above the third, said device including a primary having input terminals adapted to be connected to a source of A.C. of a given frequency, and also a secondary and a magnetic structure having non-linear characteristics coupling the primary and the secondary, and means forming a loop circuit of substantially zero leading power factor with reference to the given frequency and energized from a portion of the structure that includes magnetic flux through the secondary, and tuned to the said harmonic, said magnetic structure having a restricted saturating part of such a cross sectional area that it saturates within a fraction of a half cycle of the given frequency that is substantially $$\frac{1}{2n}$$

where $n$ is the number of said predominant harmonic.

11. A device for converting substantially sinusoidal A.C. of a given frequency to A.C. having the same fundamental but with a predominant superposed odd harmonic above the third, said device including a primary having input terminals adapted to be connected to a source of A.C. of a given frequency, and also a secondary and a magnetic structure having non-linear characteristics coupling the primary and the secondary, and means forming a loop circuit of substantially zero leading power factor with reference to the given frequency and energized from said structure and including said secondary and tuned to the said harmonic, said magnetic structure having a bridged gap, the bridging portion across the gap being of such a cross sectional area that it reaches saturation within a fraction of each half of its magnetic flux cycle that is substantially $$\frac{1}{2n}$$

where $n$ is the number of said predominant harmonic.

12. A device for converting substantially sinusoidal A.C. of a given frequency to A.C. having the same fundamental but with a predominant superposed odd harmonic, said device including input terminals adapted to be connected to a source of A.C. of a given frequency, a magnetic structure having non-linear characteristics, a closed loop including a coil on and energized from said magnetic structure and including also a condenser, said loop being tuned to said predominant harmonic, said magnetic structure having a portion that reaches saturation in a fraction of each half cycle of the source frequency when the harmonic is still increasing in value.

13. A device for converting substantially sinusoidal A.C. of a given frequency to A.C. having the same fundamental but with a predominant superposed odd harmonic about the third, said device including input terminals adapted to be connected to a source of A.C. of a given frequency, a magnetic structure having non-linear characteristics, a closed loop including a coil on and energized from said magnetic structure and including also a condenser, said loop being tuned to said predominant harmonic, said magnetic structure having a bridged gap, the bridging portion across the gap being of such a cross sectional area that it reaches saturation in a fraction of a half cycle of the source frequency while said predominant harmonic is increasing in value.

14. In combination with low pressure gaseous discharge apparatus having negative resistance characteristics, a device for operating said apparatus from a source of substantially sinusoidal alternating voltage of a given frequency, said device having an input circuit adapted to be connected to said source and an output circuit adapted to be connected to said apparatus, said device comprising a reactor and means for accentuating in said reactor an odd harmonic above the third over all the other harmonics of said frequency, said means for accentuating said harmonic comprising a condenser and inductive means in circuit with one another, the inductive means being at least a part of said reactor, said reactor including an iron core having a high reluctance gap with a saturating magnetic bridge thereacross with the bridge located in the magnetic circuit of the inductive means, and said condenser and inductive means being substantially tuned to said harmonic.

15. In combination with low pressure gaseous discharge apparatus having negative resistance characteristics, a device for operating said apparatus from a source of substantially sinusoidal alternating voltage of a given frequency, said device having an input circuit adapted to be connected to said source and an output circuit adapted to be connected to said apparatus, said device comprising an iron core reactor and means for accentuating in said reactor an odd harmonic above the third and below the tenth over all the other harmonics of said frequency, said iron core including a portion of a cross section that is restricted to saturate within a fraction of each half cycle of the given frequency which is represented by $$\frac{1}{2n}$$

where $n$ is the number of said harmonic.

16. In combination with low pressure gaseous discharge apparatus having negative resistance characteristics, a device for operating said apparatus from a source of substantially sinusoidal alternating voltage of a given frequency, said device having an input circuit adapted to be connected to said source and an output circuit adapted to be connected to said apparatus, said device comprising an iron cored reactance and means for accentuating in said reactance an odd harmonic above the third over all the other harmonics of said frequency, said means for accentuating said harmonic including a condenser, the iron core of said reactance having a high reluctance gap with a saturating magnetic bridge thereacross, said condenser and at least a part of said reactance being substantially tuned to said harmonic.

17. In combination with low pressure gaseous discharge apparatus having negative resistance characteristics, a device for operating said apparatus from a source of substantially sinusoidal alternating voltage of a given frequency, said device having an input circuit adapted to be connected to said source and an output circuit adapted to be connected to said apparatus, said device comprising an iron cored reactance having a saturating portion and means for accentuating in said reactance an odd harmonic above the third over all the other harmonics of said frequency, said means for accentuating said harmonic including a condenser, said condenser and at least a part of said reactance being substantially tuned to said harmonic, said saturating portion being of a cross section that is restricted to saturate within a fraction of each half of its magnetic flux cycle which is represented by $$\frac{1}{2n}$$

where $n$ is the number of said harmonic.

18. In combination with an alternating current supply of a given frequency, a high leakage magnetic core transformer having a saturating portion and having an input circuit connected to said supply and having also an output circuit, the input circuit including a primary and the output circuit including a secondary negative resistance electric discharge apparatus connected for energization from said output circuit, and means for producing in the output circuit a voltage wave which is of the given frequency with an accentuated superposed odd harmonic above the third and below the tenth and of a magnitude above that of all other harmonics that may be present.

19. In combination with an alternating current supply of a given frequency, a high leakage magnetic core transformer having a saturating portion and having an input circuit connected to said supply and having also an output circuit, the input circuit including a primary and the output circuit including a secondary, negative resistance electric discharge apparatus connected for energization from said output circuit, and means for producing in the output circuit a voltage wave which is of the given frequency with an accentuated superposed odd harmonic above the third and below the tenth and of a magnitude above that of all other harmonics that may be present, the saturating portion being of a cross section to reach saturation within a fraction of each half of its magnetic flux cycle which is represented by $$\frac{1}{2n}$$

where $n$ is the number of said harmonic.

20. In combination with an alternating current supply of a given frequency, a high leakage magnetic core transformer having a saturating portion and having an input circuit connected to said supply and having also an output circuit, the input circuit including a primary and the output circuit including a secondary, negative resistance electric discharge apparatus connected for energization from said output circuit, and means for producing in the output circuit a voltage wave which is of the given frequency with an accentuated superposed seventh harmonic of a magnitude above that of all other harmonics that may be present.

21. In combination with an alernating current supply of a given frequency, a high leakage magnetic core transformer having a saturating portion and having an input circuit connected to said supply and having also an output circuit, the input circuit including a primary and the output circuit including a secondary, negative resistance electric discharge apparatus connected for energization from said output circuit, and means for producing in the output circuit a voltage wave which is of the given frequency with an accentuated superposed seventh harmonic of a magnitude above that of all other harmonics that may be present, the saturating portion being of a cross section to reach satuation in one fourteenth of each half cycle of the given frequency.

22. In combination with an alternating current supply of a given frequency, a high leakage magnetic core transformer having a saturating portion and having an input circuit connected to said supply and having also an output circuit, the input circuit including a primary and the output circuit including a secondary, negative resistance electric discharge apparatus connected for energization from said output circuit, and means for producing in the output circuit a voltage wave which is of the given frequency with an accentuated superposed seventh harmonic and of a magnitude above that of all other harmonics that may be present, and which is of progressively diminishing amplitude during each half cycle of the voltage of the given frequency, the saturating portion being of a cross section to reach saturation in one-fourteenth of each half cycle of the given frequency.

23. In combination with an alternating current supply of a given frequency, a high leakage magnetic core transformer having a saturating portion and having an input circuit connected to said supply and having also an output circuit, the input circuit including a primary and the output circuit including a secondary, negative resistance electric discharge apparatus connected for energization from said output circuit, and means for producing in the output circuit a voltage wave which is of the given frequency with an accentuated superposed fifth harmonic and of a magnitude above that of all other harmonics that may be present.

24. A high reactance transformer comprising in combination a substantially closed magnetic core having primary and secondary winding sections in series magnetic relationship, means forming a gap with a saturating bridge across it in the secondary section of the core, a primary winding on the primary section of the core adapted to be connected to a source of alternating current of a given frequency, a secondary located on the secondary section of the core, and means for particularly accentuating the seventh harmonic of the given frequency in the voltage of the secondary over and above all other harmonics of said frequency.

25. A high reactance transformer comprising in combination a substantially closed magnetic core having primary and secondary winding sections in series magnetic relationship, means forming a gap with a saturating bridge across it in the secondary section of the core, a primary winding on the primary section of the core adapted to be connected to a source of alternating current of a given frequency, a secondary located on the secondary section of the core, and means for particularly accentuating an odd harmonic of the given frequency in the voltage of the secondary over and above all other harmonics of said frequency, the bridge being of a cross section to be saturated during at least a part of each half cycle of the accenuated harmonic.

26. A high reactance transformer comprising in combination a substantially closed magnetic core having primary and secondary winding sections in series magnetic relationship, means forming a gap with a saturating bridge across it in the secondary section of the core, a primary winding on the primary section of the core adapted to be connected to a source of alternating current of a given frequency, a secondary located on the secondary section of the core, the secondary core section comprising two parts with the primary core section between them, and the secondary comprising two parts one on each of the secondary core sections, and means for particularly accentuating the seventh harmonic of the given frequency in the voltage of the secondary over and above all other harmonics of said frequency.

27. A high reactance ballast for a negative resistance discharge apparatus comprising in combination a transformer having a magnetic core having primary and secondary winding sections, a primary winding on the primary section of the core adapted to be connected to a source of alternating current of a given frequency, a secondary winding located on the secondary section of the core for supplying starting voltage and operating current to negative resistance discharge apparatus, means forming a gap with a saturating bridge across it in the secondary core section, and means for particularly accentuating the seventh harmonic of the given frequency in the voltage of the secondary over the other harmonics of the given frequency.

28. A high reactance ballast for a negative resistance discharge apparatus comprising in combination a transformer having a magnetic core having primary and secondary winding sections, a primary winding on the primary section of the core adapted to be connected to a source of alternating current of a given frequency, a secondary winding located on the secondary section of the core for supplying starting voltage and operating current to negative resistance discharge apparatus, means forming a gap with a saturating bridge across it in the secondary core section, and means for particularly accentuating the seventh harmonic of the given frequency in the voltage of the secondary over the other harmonics of the given frequency, said accentuating means including a loop circuit of substantially zero and leading power factor at the given frequency and tuned to said seventh harmonic.

29. A high reactance ballast for a negative resistance discharge apparatus comprising in combination a transformer having a magnetic core having primary and secondary winding sections, a primary winding on the primary section of the core adapted to be connected to a source of alternating current of a given frequency, a secondary winding located on the secondary section of the core for supplying starting voltage and operating current to negative resistance discharge apparatus, means forming a gap with a saturating bridge across it in the secondary core section, and means for particularly accentuating the seventh harmonic of the given frequency in the voltage of the secondary over the other harmonics of the given frequency, said accentuating means including at least a portion of the secondary and a condenser in a loop circuit of substantially zero power factor and tuned to said seventh harmonic.

30. A high reactance ballast for a negative resistance discharge apparatus comprising in combination a transformer having a magnetic core having primary and secondary winding sections, a primary winding on the primary section of the core adapted to be connected to a source of alternating current of a given frequency, a secondary winding located on the secondary section of the core for supplying starting voltage and operating current to negative resistance discharge apparatus, the secondary core section comprising two parts with the primary core section between them and the secondary comprising two parts one on each of the secondary core sections, means forming a gap with a saturating bridge across it in each of the respective parts of the secondary core section, and means for particularly accentuating the seventh harmonic of the given frequency in the voltage of the secondary over the other harmonics of the given frequency.

31. A high reactance ballast for a negative resistance discharge apparatus comprising in combination a transformer having a magnetic core having primary and secondary winding sections, a primary winding on the primary section of the core adapted to be connected to a source of alternating current of a given frequency, a secondary winding located on the secondary section of the core for supplying starting voltage and operating current to negative resistance discharge apparatus, the secondary core section comprising two parts with the primary core section between them and the secondary comprising two parts one on each of the secondary core sections, means forming a gap with a saturating bridge across it in each of the respective parts of the secondary core section, and means for particularly accentuating the seventh harmonic of the given frequency in the voltage of the secondary over the other harmonics of the given frequency, said accentuating means including a loop circuit of substantially zero power factor and tuned to said seventh harmonic.

32. A high reactance ballast for a negative resistance discharge apparatus comprising in combination a transformer having a magnetic core having primary and secondary winding sections, a primary winding on the primary section of the core adapted to be connected to a source of alternating current of a given frequency, a secondary winding located on the secondary section of the core for supplying starting voltage and operating current to negative resistance discharge apparatus, the secondary core section comprising two parts with the primary core section between them and the secondary comprising two parts one on each of the secondary core sections, means forming a gap with a saturating bridge across it in each of the respective parts of the secondary core section, and means for particularly accentuating the seventh harmonic of the given frequency in the voltage of the secondary over the other harmonics of the given frequency, said accentuating means including at least a portion of the second and a condenser in a loop circuit of substantially zero power factor and tuned to said seventh harmonic.

33. A high reactance transformer including a magnetic core structure having a primary core section and a secondary core section, a primary on said primary core section adapted to be connected to a source of alternating current of a given frequency, a secondary, said secondary comprising a first part constituting a minor number of secondary turns connected in series with a second part constituting a major number of secondary turns and carrying the same current as the first part, the first part being closely coupled with the primary and constituting one coil therewith located on the primary core section, the second secondary part constituting another coil located on the secondary core section and loosely coupled with the primary to provide a high leakage reactance, and means for inducing in the secondary, a predominant odd harmonic of said given frequency, said harmonic being above the third and below the tenth.

34. A high reactance transformer for negative resistance arc discharge apparatus comprising in combination a substantially closed magnetic core having primary and secondary winding sections, means forming a gap with a saturating bridge across it in the secondary section of the core, a primary winding coil on the primary section of the core, a major fractional part of the coil being adapted to be connected to a source of alternating current of a given frequency to constitute a primary, a secondary winding coil located on the secondary section of the core and loosely coupled with the primary, the primary winding coil having additional turns closely coupled with the part of the primary that is adapted to be connected across the source of voltage, which additional turns are connected in series with the secondary coil together to constitute a secondary connected in auto-transformer relationship with the primary, and means for particularly accentuating the seventh harmonic of the given frequency in the voltage of the secondary, said last means including a condenser and a loop circuit that includes the condenser and at least a portion of said secondary and excludes the said arc discharge apparatus, said loop circuit being tuned to accentuate the seventh harmonic of said given frequency over the other harmonics of said given frequency in the secondary output circuit.

35. A high reactance transformer for two serially connected arc discharge devices comprising in combination a substantially closed magnetic core having primary and secondary winding sections, means forming a gap with a saturating bridge across it in the secondary section of the core, a primary winding on the primary section of the core adapted to be connected to a source of alternating current of a given frequency, a secondary in step-up auto-transformer relationship to the primary and located on the secondary section of the core for supplying starting voltage and operating current to a plurality of arc discharge devices in series, the secondary core section comprising two parts and the primary core section being between the two parts of the secondary core section, the secondary comprising two parts one on each of the secondary core sections, and means for producing the seventh harmonic of the given frequency in the voltage of the secondary and accentuating it to a value above that of every other harmonic that may be present.

36. A high reactance transformer for two serially connected discharge devices each of which has a pair of electrically heated cathodes, comprising in combination a substantially closed magnetic core having primary and secondary winding sections, a primary winding on the primary section of the core adapted to be connected to a source of alternating current of a given frequency, a secondary in step-up auto-transformer relationship to the primary and located on the secondary section of the core for supplying starting voltage and operating current to a plurality of discharge devices in series, means forming a gap with a saturating bridge across it in the secondary section of the core, three electrically separate heating windings on the transformer for supplying heating currents to the cathodes, and means for particularly accentuating an odd harmonic of the given frequency in the voltage of the secondary, the bridge having a cross section of a size to saturate in a fraction of each half cycle of the given frequency which is represented by $\frac{1}{2}n$ where $n$ is the number of said harmonic.

37. A high reactance transformer for two serially connected discharge devices having electrically heated cathodes, comprising a substantially closed magnetic core having primary and secondary winding sections, a primary winding on the primary section of the core adapted to be connected to a source of alternating current of a given frequency, a secondary located on the secondary section of the core for supplying starting voltage and operating current to discharge apparatus, means forming a saturating portion in the main flux path through the secondary section of the core and of a cross section to saturate in one-fourteenth of each half cycle of said given frequency, the transformer having three electrically separate heating windings for supplying heating currents to the cathodes, and means including said saturating portion for accentuating the seventh harmonic of the given frequency in the voltage of the secondary over and above all other harmonics of said frequency.

38. A device for converting substantially sinusoidal A.C. of a given frequency and voltage to A.C. of the same frequency but with a substantial superposed odd harmonic above the third, said device comprising a reactor and means for accentuating in said reactor said harmonic over all the other harmonics of said frequency, said means for accentuating said harmonic comprising a condenser and inductive means in circuit with one another, the inductive means being at least a part of said reactor, said reactor including an iron core having a portion which is of a cross section to saturate before the major part of the iron core saturates, said portion being in the flux path through the inductive means, and said condenser and inductive means being substantially tuned to said harmonic.

39. Ballast apparatus for starting and operating high wattage fluorescent lamps comprising a high reactance transformer including a shell type magnetic core having an elongated secondary core leg and a pair of elongated yoke core legs defining magnetic circuits with said secondary core leg, a primary coil and secondary coils arranged on the side by side portions of the central core leg with the secondary coils located on opposite sides of the primary coils and connected in series with one another to constitute one secondary, a capacitor connected in series with said secondary for connection in series with a fluorescent lamp, a plurality of heating windings arranged on said central core leg in the region of said primary for supplying voltage to the cathodes of a fluorescent lamp, said central core leg having a pair of transverse slots one in the leakage flux path of one of the secondary coils and the other in the leakage flux path of the other secondary coil, said slots forming bridged gaps.

40. A high reactance ballast transformer of claim 39 wherein the primary coil and the secondary coils are connected in step-up auto-transformer relationship.

41. A ballast of claim 39 wherein the primary coil is adapted to be connected to a source of A.C. of a predetermined voltage and frequency and wherein a condenser shunts at least a part of the secondary and is of a capacity to resonate with the shunted part of the secondary at a frequency which is an odd harmonic of said predetermined frequency.

42. A ballast such as is defined in claim 41 wherein the bridges at the gaps are of a cross sectional area to saturate during the time of voltage rise of each half cycle of the given frequency which is less than the time required for the harmonic to rise from zero to its peak value.

43. Ballast apparatus for starting and operating high wattage fluorescent lamps comprising a high reactance transformer including a shell type magnetic core having an elongated secondary core leg and a pair of elongated yoke core legs defining magnetic circuits with said secondary core leg, a primary coil and secondary coils arranged on the side by side portions of the central core leg with the secondary coils located on opposite sides of the primary coils and connected in series with one another to constitute one secondary, a capacitor connected in series with said secondary for connection in series with a fluororescent lamp, said central core leg having a pair of transverse slots one in the leakage flux path of one of the secondary coils and the other in the leakage flux path of the other secondary coil, said slots forming bridged gaps.

44. A high reactance ballast transformer comprising a shell type magnetic core having an elongated central core leg and a pair of yoke legs defining magnetic circuits with said central core leg, a primary winding and a secondary winding arranged in abutment on said central core leg, said central core leg having a pair of spaced transverse slots forming bridged gaps in the magnetic circuit of the leakage flux of said secondary, and a condenser shunting at least a part of the secondary.

45. A high reactance ballast transformer of claim 44 wherein the primary winding is adapted to be connected to a source of A.C. of a predetermined voltage and frequency and wherein a condenser shunts at least a part of the secondary and is of a capacity to resonate with the shunted part of the secondary at a frequency which is an odd harmonic of said predetermined frequency.

46. In combination with two series connected discharge devices connected in a circuit including a by-pass condenser shunting one of the devices and a series condenser in series with both of the devices, a multi winding transformer adapted to be connected to a source of A.C. of a predetermined frequency and voltage for supplying starting and operating voltage to said circuit, and a loop circuit including another condenser and one of the windings of the transformer which loop is tuned to resonate at an odd harmonic above the third of said predetermined frequency.

47. A combination as set forth in claim 46 wherein the transformer includes a primary and a secondary in step-up auto-transformer relationship for supplying the voltage to said circuit including said devices.

48. A combination as set forth in claim 47 wherein said one of the windings is in the magnetic circuit of the secondary and connected across said primary and said secondary.

49. In combination with two series connected discharge devices connected in a circuit including a by-pass condenser shunting one of the devices and a series condenser in series with both of the devices, a multi winding transformer adapted to be connected to a source of A.C. of a predetermined frequency and voltage for supplying starting and operating voltage to said circut, and a loop circuit including another condenser and one of the windings of the transformer, which loop is tuned to resonate at an odd harmonic of said predetermined frequency, said transformer including a primary and a secondary in step-up auto-transformer relationship for supplying the voltage to the circuit including said devices, said one of the windings being in the magnetic circuit of the secondary, and said loop being connected across said primary and secondary.

50. In combination with two series connected discharge devices connected in a circuit including a by-pass condenser shunting one of the devices and a series condenser in series with both of the devices, a multi winding transformer adapted to be connected to a source of A.C. of a predetermined frequency and voltage for supplying starting and operating voltage to said circuit, and a loop circuit including another condenser and one of the windings of the transformer which loop is tuned to resonate at an odd harmonic of said predetermined frequency, said transformer including a primary and a secondary for supplying the voltage to said devices, said one of the windings being in the magnetic circuit of the secondary, and said loop being connected across said primary.

51. In combination with two series connected discharge devices connected in a circuit including a by-pass condenser shunting one of the devices and a series condenser in series with both of the devices, a multi winding transformer adapted to be connected to a source of A.C. of a predetermined frequency and voltage for supplying starting and operating voltage to said circuit, and a loop circuit including another condenser and one of the windings of the transformer which loop is tuned to resonate at an odd harmonic of said predetermined frequency, said transformer including a primary and a secondary for supplying the voltage to said devices, said one of the windings being the magnetic circuit of the secondary, and said loop being connected across said secondary.

52. In combination with two series connected discharge devices connected in a circuit including a by-pass condenser shunting one of the devices and a series condenser in series with both of the devices, a multi winding transformer adapted to be connected to a source of A.C. of a predetermined frequency and voltage for supplying starting and operating voltage to said circuit, and a loop circuit including another condenser and one of the windings of the transformer which loop is tuned to resonate at an odd harmonic of said predetermined frequency, said transformer including a primary and a secondary for supplying the voltage to said devices, said one of the windings being the magnetic circuit of the secondary, and said loop being connected across at least a portion of the secondary.

53. In combination with two series connected discharge devices connected in a circuit including a by-pass condenser shunting one of the devices and a series condenser in series with both of the devices, a multi winding transformer adapted to be connected to a source of A.C. of a predetermined frequency and voltage for supplying starting and operating voltage to said circuit, and a loop circuit including another condenser and one of the windings of the transformer which loop is tuned to resonate at an odd harmonic of said predetermined frequency, said transformer including a primary and a secondary for supplying the voltage to said devices, said one of the windings being the magnetic circuit of the secondary, and said loop being connected across said series condenser.

54. In combination with two series connected discharge devices connected in a circuit including a by-pass condenser shunting one of the devices and a series condenser in series with both of the devices, a multi winding transformer adapted to be connected to a source of A.C. of a predetermined frequency and voltage for supplying starting and operating voltage to said circuit, said transformer including a primary and a secondary in step-up autotransformer relationship for supplying the voltage to said devices, and a loop circuit including a condenser and at least a part of the secondary winding of the transformer, which loop is tuned to resonate at said predetermined frequency.

55. In combination with a plurality of electric discharge devices connected in a circuit including a first condenser and an inductance device in series with one another and with the discharge devices, a second condenser in a loop circuit that includes one of the discharge devices and excludes the other discharge device and the inductive device, a third condenser in a loop circuit that includes at least a part of the inductive device and excludes both discharge devices, all three condensers having one common terminal.

56. A structure such as is defined in claim 18 wherein the harmonic producing means includes a portion of the core that is in the leakage flux path of the secondary and which is of a size to saturate within a fractional part of each half cycle of the given frequency which fraction is represented by $$\frac{1}{2n}$$

where $n$ is the number of the harmonic.

57. A structure such as is defined in claim 38 wherein the harmonic referred to is the fifth harmonic.

58. A structure such as is defined in claim 38 wherein the harmonic referred to is the seventh harmonic.

59. A structure such as is defined in claim 38 wherein the harmonic referred to is the ninth harmonic.

60. A high reactance ballast transformer adapted to be connected to a source of A.C. of a predetermined frequency, said ballast transformer comprising a magnetic core, a primary winding and a secondary winding on different parts of said core, said core having spaced apart saturating portions in the magnetic circuit of the leakage flux of said secondary winding, one of said portions being substantially closer to the primary than is the other portion and providing a smaller percentage of core restriction than does the other portion, and means shunting at least a part of the secondary winding turns and with said shunted winding part forming a circuit tuned to an odd harmonic above the third of said predetermined frequency.

61. A high reactance ballast transformer adapted to be connected to a source of A.C. of a predetermined frequency, said ballast transformer comprising a shell type magnetic core having an elongated central core leg and a pair of yoke core legs defining magnetic circuits with said central core leg, a primary winding and a secondary winding on different parts of said central core leg, said central core leg having spaced apart saturating portions in the magnetic circuit of the leakage flux of said secondary winding, one of said portions being substantially closer to the primary than is the other portion and providing a smaller percentage of core restriction than does the other portion, and means shunting at least a part of the secondary winding turns and with said shunted winding part forming a circuit tuned to an odd harmonic above the third of said predetermined frequency.

62. A high reactance ballast transformer adapted to be connected to a source of A.C. of a predetermined frequency, said ballast transformer comprising a magnetic core, a primary winding and a secondary winding on different parts of said core, said core having spaced slots forming bridged-gaps in the magnetic circuit of the leakage flux of said secondary winding, one of said slots being substantially closer to the primary than is the other slot and providing a smaller percentage of core restriction than does the other slot, and a condenser shunting at least a part of the secondary winding turns and with said shunted winding turns forming a circuit tuned to an odd harmonic above the third of said predetermined frequency.

63. A high reactance ballast transformer adapted to be connected to a source of A.C. of a predetermined frequency, said ballast transformer comprising a shell type magnetic core having an elongated central core leg and a pair of yoke core legs defining magnetic circuits with said central core leg, a primary winding and a secondary winding on different parts of said central core leg, said central core leg having spaced slots forming bridged-gaps in the magnetic circuit of the leakage flux of said secondary winding, one of said slots being substantially closer to the primary than is the other slot and providing a smaller percentage of core restriction than does the other slot, and a condenser shunting at least a part of the secondary winding turns and with said shunted winding turns forming a circuit tuned to an odd harmonic above the third of said predetermined frequency.

References Cited in the file of this patent

UNITED STATES PATENTS

| | | |
|---|---|---|
| 2,563,595 | Feinberg | Aug. 7, 1951 |
| 2,722,628 | Cates et al. | Nov. 1, 1955 |
| 2,802,143 | Kobayashi | Aug. 6, 1957 |
| 2,824,263 | Strecker et al. | Feb. 18, 1958 |